Patented Apr. 15, 1952

2,592,964

UNITED STATES PATENT OFFICE 2,592,964

FRACTIONATION OF DIBASIC ACIDS

Andrew I. Smith, Long Beach, Calif., assignor to Union Oil Company of California, Los Angeles, Calif., a corporation of California No Drawing. Application May 5, 1949, Serial No. 91,650

8 Claims. (Cl. 260—451)

This invention relates to methods for the fractionation of the water-soluble portion of oxidized wax and other oxidized products whereby dibasic acids are separated therefrom. More particularly, this invention relates to methods for the oxidation of petroleum wax and other paraffin hydrocarbons whereby succinic acid and homologs of succinic acid are produced and to methods for separating the succinic acid and the homologs of succinic acid from each other and from the kindred oxidation products.

The preparation of succinic acid by the oxidation of paraffin hydrocarbons and particularly by the oxidation of wax is disclosed and claimed in a copending application of Orville L. Polly, Serial No. 28,950, filed May 24, 1948, now U. S. Patent No. 2,533,620.

It is an object of this invention to oxidize wax and other paraffinic hydrocarbons to produce oxidation products and to recover succinic acid and other dibasic acids containing less than 13 carbon atoms per molecule from such oxidation products.

It is an object of this invention to recover dibasic acid fractions from oxidized wax products which are relatively free of succinic acid and of color bodies.

It is an object of this invention to provide a method for the resolution of the aqueous extract of oxidized wax wherein a common agent is used to facilitate the dehydration of the extract and to provide a solvent for the dehydrated extract wherein the solvent has the property of causing a complete rejection of succinic acid from the dehydrated extract.

It is another object of this invention to provide a method for the removal of succinic acid from oxidized wax.

It is another object of this invention to provide a method for the removal of color bodies from the water-soluble products of oxidized wax.

It is another object of this invention to provide a method for the separation of dibasic acids from oxidized wax and other paraffin hydrocarbons and to provide a method for the fractionation of the acids obtained thereby.

It is another object of this invention to provide a method for the recovery from the aqueous extract of oxidized wax dibasic acids or esters thereof in a form which is relatively free of more highly oxidized materials such as hydroxylated and ester linkage-containing dibasic acids.

Briefly, my invention relates to methods for the synthesis of succinic acid and its homologs by the controlled oxidation of selected paraffin wax fractions and to methods for recovering the succinic acid and its homologs from the resulting oxidation products. The petroleum wax fraction is oxidized by blowing the melted wax with an oxygen-containing gas at moderate temperatures until a relatively high acid number has been obtained. The oxidized wax is then extracted with water at a temperature preferably near the boiling point whereby succinic acid and/or other lower dibasic acids having less than 13 carbon atoms per molecule and kindred water-soluble oxidation products are extracted from the oxidized wax. In one modification of the invention the hot aqueous extract is first subjected to a preliminary distillation, preferably under vacuum, to remove a large part of the water and a part of the more volatile oxidation products. The residue from the preliminary distillation, or alternatively the entire unprocessed aqueous extract, is then distilled in the presence of an excess of an aromatic hydrocarbon solvent having less than 9 carbon atoms or a mixture thereof whereby the residual water is taken overhead as an azeotrope with the aromatic hydrocarbon. The distillation of certain low boiling oxidation products such as acids, esters, aldehydes and the like is facilitated by the addition of the aromatic hydrocarbon solvent. The condensed distillate separates into water-rich and hydrocarbon-rich phases, the latter normally being returned to the distillation column as reflux. The dehydrated extract is obtained as a solution thereof in the excess aromatic hydrocarbon solvent which is specifically provided therefor. The distillation residue is withdrawn and cooled whereupon the succinic acid content separates as a crystalline solid. The succinic acid-free mother liquor is then diluted with a relatively large volume of aromatic hydrocarbon solvent or diethyl ether whereupon a small amount of a second liquid phase separates which contains the major portion of the color bodies and other contaminants difficultly removable from the mother liquor. The mother liquor, after the removal of the color bodies, is then treated with a lower molecular weight paraffinic hydrocarbon either stepwise or in a single stage to precipitate from the residual liquor an impure dibasic acid fraction containing ester linkages and hydroxyl groups. The impure dibasic acids fraction may be further resolved by esterifying the fraction with a lower molecular weight alcohol such as methyl, ethyl, propyl or isopropyl alcohols and subjecting the ester to extraction with pentane or other lower molecular weight paraffinic hydrocarbon to dissolve the esters of nonhydroxylated dibasic acids and to reject the esters of the hydroxylated acids. The residual liquor from the precipitation of the impure dibasic acid fraction after evaporation of the solvent separates a solid on standing which is rich in adipic and suberic acids.

The process of the present invention includes the several steps of (A) oxidation, (B) water extraction, (C) distillation, (D) azeotropic distillation, (E) cooling and filtration, (F) color body removal, (G) solvent rejection of impure dibasic acids, and (H) solvent recovery. A relatively pure dibasic acid fraction is obtained by the evaporation of the solvents in step H. In one modification of the invention the solvent rejected impure dibasic acids from step G can be esterfied with a lower molecular weight alcohol in an esterification step (I) and the esters subjected to solvent extraction with a lower molecular weight hydrocarbon.

The preferred oxidation feed stock to step A is a petroleum paraffin wax which is predominantly composed of paraffinic hydrocarbons having between about 15 and 50 carbon atoms per molecule, and preferably between about 20 and 35 carbon atoms per molecule. The wax is preferably a higher melting wax such as those refined waxes which melt above about 30° C. and preferably between about 50° and 90° C. Particularly satisfactory waxes melt at about 60° to 65° C.

The wax should be substantially free of any hydrocarbons containing aromatic rings since these compounds will oxidize to form inhibitors which repress further oxidation of the residual hydrocarbons. The wax to be oxidized should also be relatively free of hydrocarbons containing naphthene rings since these tend to form peroxides in the product which, in some cases, seem to decrease the yield of desirable oxidation products.

A very suitable wax for the production of succinic acid is one which has been prepared by modern solvent refining technique. Thus, a topped petroleum residuum or lubricating oil fraction thereof is extracted with liquefied propane to separate asphalt from the oil and the thus de-asphalted oil in propane solution is subsequently de-waxed by chilling to temperatures in the neighborhood of −40° C. to crystallize wax which is then separated, such as by filtration, settling or centrifuging, from the propane-oil solution. The wax thus separated from the dewaxing step contains oil and this oil is removed by chilling it and then adding a cold solvent, such as methyl ethyl ketone, to dissolve oil and low melting wax and then filtering to separate a high melting de-oiled wax. Such methods are well known and are generally described in U. S. Patent No. 2,229,658. The wax thus obtained by this and other solvent refining processes is relatively free of objectionable materials for wax oxidation purposes. The melting point of the refined wax is usually above 30° C. and may even be as high as 75° C. or more. Such waxes are substantially straight chain normal paraffins and are only slightly isoparaffinic. Although solvent refining gives a very desirable oxidation feed stock, waxes refined by other methods and from other sources may also be used in the process of this invention, such as refined tank bottoms wax and other petroleum-derived wax fractions as well as waxes obtained by the hydrogenation of carbon monoxide.

Although the paraffin waxes are the most desidable feed stocks for the production of succinic acid, other hydrocarbons such as paraffins and isoparaffins, which contain at least 10 carbon atoms per molecule, may also be employed provided they comprise mostly molecules which contain an unsubstituted tetramethylene grouping of the type illustrated by the following formula:

$$R-CH_2-CH_2-CH_2-CH_2-R'$$

wherein R and R' are saturated aliphatic radicals which contain at least 3 carbon atoms.

The oxidation of the paraffin wax in step A is carried out in the liquid phase by blowing the melted wax with an oxygen-containing gas until the desired acid number has been attained. The yield of succinic acid and genitors of succinic acid obtained by the oxidation of wax is dependent upon the temperature of the oxidation. High temperatures promote the decomposition of succinic acid and/or its derivatives and at lower temperatures the oxidation reaction is unduly slow. The oxidation is carried out at a temperature above the melting point of the wax and below 160° C., or between about 100° and 160° C. The preferred temperature range is from 120° to 140° C.

The oxidation of the paraffin wax is continued until the acid number is between about 200 and 250 and preferably in the range of 235 to 250. When the oxidation is discontinued at acid numbers below 200, only small amounts of succinic acid are obtained. When the oxidation is continued until the acid number is in the range of 235 to 250, the greatest yield of succinic acid is obtained and also the succinic acid is more readily separated from such oxidized products according to the methods of this invention.

The term "acid number" represents the numerical value of the "acidity" which latter term has the units of mg. of KOH per gram. The method for the determination of acid numbers is described in "ASTM Standards on Petroleum Products and Lubricants," November 1948, page 544.

The term "saponification number" is the numerical value of the saponifiable material which has the units of mg. of KOH per gram and is determined according to the method described in "ASTM Standards on Petroleum Products and Lubricants," November 1948, page 57.

In step A, the oxidation feed stock is subjected to liquid phase oxidation by contacting the melted feed stock with a gas containing free oxygen, such as air, oxygen-enriched air, oxygen and the like. The oxidation is preferably carried out under pressures which may vary between 0.2 and 20 atmospheres and preferably between normal atmospheric pressure and 10 atmospheres. The oxidation temperature is above the melting point of the wax being oxidized and below 160° C. and is preferably in the range of 120° to 140° C. The wax is melted and introduced into a reaction vessel which is equipped with means for both heating and cooling the contents. The vessel is preferably in the form of a vertical column provided with heating coils in the lower section, and is only partially filled with the molten wax in order to leave ample free space above the liquid to provide for foaming and vapor space. The melted wax is then heated to between about 100 and 160° C. by means of the heating coils and the gas containing free oxygen, such as air, is passed into the bottom of the vessel under pressure through a distributor which insures adequate dispersion of the air in the form of fine bubbles throughout the liquid. This insures efficient air utilization in the oxidation. The volumetric rate at which the air or other oxidizing gas is introduced may vary between about 1 and 20 cubic feet per barrel of hydrocarbon per minute. The barrel herein referred to is the 42-gallon barrel of the petroleum industry. The preferred air rate is between about 10 and 15 cubic feet per barrel per minute. The oxidation is performed under pressure which increases the oxidation rate and also limits excessive evaporation of the desired oxidation products, while allowing the evaporation of some of the lower molecular weight acidic oxidation products. The effect of oxidizing under pressure only increases the reaction rate and does not alter the product distribution or types of products providing the pressure is in the range of 0.2 to 20 atmospheres. The volatilized lower molecular weight compounds may be subsequently recovered and purified according to conventional processes. The removal of the lower molecular weight acids appears to aid the oxidation. The effluent gases leaving the oxidizing vessel may be cooled so as to recover the lower molecular weight normally-liquid oxidation products. These products include formic, acetic, and propionic acids and other oxygenated materials.

The oxidation operation, above described as a batch process conducted in a single vessel, may be conducted on a continuous basis in a series of smaller vertical reaction vessels, each equipped for heating and cooling and provided with means for introduction of the gas containing oxygen. The paraffin wax may be passed successively through the series of vessels to undergo oxidation. The advantages offered by such a mode of operation include, among others, a steady flow of product, a uniform product quality, and the ease of control of the operation.

Following the initiation of the oxidation reaction, less heat is required to maintain the desired temperature because of the heat developed by the reaction. Thus, it is sometimes necessary to discontinue heating and remove heat by cooling the reactor to maintain the desired temperature. Whether the operation is carried out exothermically or endothermically is largely determined by the pressure, temperature, and the amount of air or other oxygen-containing gas employed in the reaction as well as the size of the oxidation vessel.

During the oxidation step, a considerable quantity of volatile low molecular weight oxidation products are recovered by cooling and separation from the accompanying water formed by the oxidation process. A separation of these materials is relatively simple and is carried out by conventional methods.

The oxidized wax is then water washed in step B to extract succinic acid and its homologs from the oxidized wax along with the other water-soluble components such as lower molecular weight fatty acids, alpha-hydroxy acids and the like. The water-washing process is most easily conducted at 50° to 130° C. and preferably at 80° to 120° C. Under these conditions, the oxidized wax is melted and the water washing operation is facilitated by the fluidity and increased mobility of the molten oxidate. When the washing is carried out at temperatures above about 100° C., it is necessary to employ a suitable pressure on the system to prevent distillation of the water from the mixture. It is generally desirable to use two or more washes employing about 2 to 10 volumes of water per volume of oxidized wax per wash. Any convenient apparatus may be used for the water-washing step such as a series of mixing and settling vessels or a conventional extraction column.

The water-washed, water-insoluble oxidized wax fraction generally has an acid number of about 100 to 175 when an oxidized wax having an acid number of about 250 is washed. The water-washed, oxidized wax contains oxygenated products which generally range from about 6 to 50 or more carbon atoms per molecule. The water-washed, water-insoluble oxidized wax may be processed to recover its valuable constituents. Alternatively however, the fraction can be recycled to the oxidizer wherein more succinic acid can be produced by its oxidation.

The aqueous extract from water extraction step B is distilled in distillation step C to remove the bulk of the water and lighter oxidation products. The distillation step may be effected at reduced pressure or at near atmospheric pressure to produce a product containing between about 10 and 30 and preferably about 20 to 25% by weight of water. In the distillation step it is desirable to employ low temperatures such as below about 170° C. and preferably below about 150° C. in order to minimize the decomposition of the accompanying thermally unstable oxidation products and to minimize the inter-reaction of the components of the distillation feed or of the decomposition fragments.

In azeotropic distillation step D the residue from distillation step C containing between 10 and 30% by weight of water, or alternatively the entire aqueous extract where distillation step C is omitted, is then mixed with an aromatic hydrocarbon solvent having less than 9 carbon atoms such as for example benzene, toluene, ethyl benzene, ortho meta or para xylene and/or mixtures thereof and is redistilled in the presence of the solvent to complete the removal of the water and volatile oxidation products therefrom. The preferred hydrocarbon solvent is benzene. In the preferred distillation method the azeotropic distillate is condensed whereby two liquid phases are obtained, the one hydrocarbon-rich and the other water-rich. The hydrocarbon-rich layer is returned to the distillation column either as reflux or with the incoming feed. The water layer is removed and may be processed to recover the oxidized components dissolved therein. The amount of hydrocarbon solvent employed depends upon the particular hydrocarbon solvent chosen and upon the method of distillation employed. In general, the amount of aromatic hydrocarbon solvent added to the water containing feed to step D is controlled to provide a distillation bottoms residue from the azeotropic distillation which contains between about 0.5 and 3.0 and preferably between about 1.0 and 2.5 parts by weight of oxidation product per part by weight of aromatic hydrocarbon.

In step E the distillation residual solution from step D is cooled, whereby solid succinic acid separates out and is removed by filtration. Cooling to about atmospheric temperature is generally sufficient for the complete crystallization of the succinic acid from the solution. In certain instances cooling below atmospheric temperature may be employed with suitable provision being made to prevent excessive cooling which could cause rejection of other dibasic acids and/or color bodies from the solution or even freezing of the solvent, e. g. benzene. The crystalline succinic acid obtained thereby is generally about 60 to 80% pure and usually requires about two or three recrystallizations from such solvents as diethyl ether, diisopropyl ether, methyl ethyl ketone, methyl propyl ketone, methyl isopropyl ketone, diethyl ketone, propyl alcohol, water or combinations of the foregoing solvents and the like in order to increase its purity to 99% or higher. Usually treatment with activated carbon in water is employed to remove the last traces of colored contaminants. When the impure succinic acid is contaminated with inorganic salts such as might arise from corrosion of metallic equipment or from the use of impure water in the water-washing step, these impurities can be removed by slurrying the mixture with acetone which dissolves the succinic acid and leaves the salts undissolved. After separation of the solids the succinic acid is recovered by evaporation of the acetone. The product obtained thereby is light colored and may be further purified by recrystallization if desired.

In the preferred method for removing color bodies in step F the mother liquor from the separation of succinic acid, usually containing between about 0.5 and 3.0 parts of aromatic hydrocarbon solvent, is diluted with between about 4 and 10 and preferably with between about 4.5 and 6 parts by weight of diethyl ether per part by weight of oxidation products contained in the mother liquor. At temperatures near atmospheric and preferably in the range of about 8° to +25° C. there is rejected from the solution a small amount of a dark viscous material which generally comprises about 1 to 5% by weight of the oxidation products in the system and contains most of the color bodies originally present in the liquor. The rejected color bodies-containing fraction for the purpose of this invention are discarded. In addition to diethyl ether other aliphatic ethers having from 2 to 6 carbon atoms per molecule may be employed such as dimethyl, methyl ethyl, methyl propyl, methyl isopropyl, dipropyl and diisopropyl ethers. Diethyl ether is however the preferred ether for the purpose.

In an alternative method for removing color bodies in step F the mother liquor from the separation of succinic acid is then diluted with additional aromatic hydrocarbon solvent of the type previously described and in amounts sufficient to increase the parts of aromatic hydrocarbon by weight to between about 4 and 10 and preferably to between about 4.5 to 6 per part by weight of oxidation products in the liquor. A moderate amount of a second liquid phase is separated by this dilution which comprises roughly 20% by weight of the dehydrated water-soluble extract and contains much of the color bodies originally present in the mother liquor. These color bodies are difficultly removable from the final products by other methods. The color-containing liquid is removed and for purposes of this invention is discarded.

The solvent-rich liquor from the color body removal step F contains the low molecular weight fatty acids, hydroxylated acids, keto acids, esters and the like along with aliphatic dibasic acids having more than 4 and less than 13 carbon atoms as well as corresponding hydroxylated dibasic acids.

In solvent rejection step G a paraffinic hydrocarbon solvent is added to the solution of the aforementioned compounds in the aromatic hydrocarbon solvent or in the mixed hydrocarbon-ether mixtures to cause the separation of a liquid fraction, or of successive liquid fractions, which separated fraction or fractions contain impure dibasic acids contaminated with hydroxylated acids and esters. Where color body removal step F is omitted for any reason the mother liquor from step E can be treated with paraffinic solvents to separate the impure dibasic acids fraction therefrom although much darker products will be obtained.

Suitable paraffinic hydrocarbon solvents include any of the low boiling paraffinic fractions which may be isolated from petroleum fractions in varying degrees of purity. Suitable fractions include propanes, butanes, pentanes, hexanes, heptanes, octanes and/or mixtures thereof and the like. The paraffinic hydrocarbon fraction is preferably chosen such that its boiling range is at least about 25° C. above or below the boiling range of the aromatic hydrocarbon solvent employed previously. Accordingly, the paraffin and aromatic solvents are then separable by simple distillation and azeotropic or extractive distillations to effect their separation are avoided. Where an ether, an aromatic hydrocarbon solvent, and a paraffinic hydrocarbon solvent are employed it is preferable to choose respective members which can be separated by distillation insofar as is possible.

The total volume of paraffinic solvent employed to reject the impure dibasic acids fraction is generally between about 0.3 and 10.0 and preferably between about 0.5 and 3.0 parts by weight of solvent per part by weight of mother liquor from succinic acid separation step E or of solvent diluted mother liquor from color body removal step F or of the diluted mother liquor from step F after a partial evaporation of the solvent. The rejection of the dibasic acids fraction may be carried out in a single stage wherein the paraffinic solvent is added to the mother liquor or the diluted mother liquor or the partially evaporated mother liquor in a single dump. Alternatively, the solvent may be added in two or more successive stages to separate successive fractions of varying dibasic acid content.

In solvent recovery step H the residual liquor from the paraffinic hydrocarbon rejection of the impure dibasic acid fraction is evaporated to remove the solvent whereby there is formed a relatively pure light colored concentrate of dibasic acids. Upon standing a solid separates out of the dibasic acid concentrate which is a mixture of adipic and suberic acids relatively free of other products.

The solvent vapors from the evaporation are condensed and are separated into aromatic-rich and paraffin-rich fractions by distillation and are recycled. Where ether has been employed in the color rejection step the ether is separated from the condensed vapors and is returned to the color body removal step F.

In step I in one modification of the invention the paraffin rejected impure dibasic acid fraction is esterified with a low molecular weight alcohol such as methyl, ethyl, propyl or isopropyl alcohols. The esterification is most easily effected by refluxing the acids with an excess of the alcohol being employed in the presence of an acid catalyst such as sulfuric acid, hydrochloric acid, benzene sulfonic acid, naphthalene sulfonic acid, hydrogen zeolites, and the like. Other methods may be employed for effecting the esterification however.

In step J the esterified acids after removal of the excess alcohol are extracted with a low molecular weight paraffinic hydrocarbon of the type described hereinbefore. The paraffinic solvent dissolves the esters of the dibasic acids and rejects the esters of the hydroxylated acids and other miscellaneous oxidation product contaminants. By saponification of the dibasic acid esters, the purified dibasic acids are obtained.

Perhaps the process of this invention can best be understood by reference to the following specific examples:

*Example I*

About 1000 parts by weight of a refined petroleum wax having a melting point between 63° and 69° C. is introduced into an oxidation vessel provided with heating and cooling coils. The wax is melted and the temperature increased to about 130° C. Air at a pressure of 150 pounds per square inch gauge is employed as the oxidizing agent and is passed through the oxidation vessel at a rate of about 5.5 cubic feet per barrel per minute. At the end of about 24 hours, the oxidation reaction has begun to progress satisfactorily and the temperature is lowered to 120° C. At the end of 132 hours, the oxidation is stopped. About 1070 parts by weight of an oxidized product having an acid number of 250 is obtained.

The 1070 parts by weight of oxidized wax is melted, heated to 95° C., and is washed four times with water at about 95° C., employing about 2150 parts by weight of water per wash. The combined water washes comprises about 268 parts by weight of water-soluble oxidation products in about 8600 parts by weight of water. The combined water washings are distilled at atmospheric pressure until the temperature of the still bottoms is about 145° C. A dibasic acid-containing mixture is obtained as the bottoms product consisting of about 81% by weight of organic oxidation products and about 19% by weight of water.

About 500 parts by weight of the dibasic acid-containing mixture are refluxed with about 696 parts by weight of benzene for a period of 6 hours. The distillate is condensed and separated into a water-rich phase and a benzene-rich phase, the water being withdrawn from a water trap provided therefore and the benzene being returned continuously to the distillation flask. About 96 parts by weight of water are removed thereby. The hot dehydrated benzene-rich bottoms from the dehydration step is a clear homogeneous liquid while the charge to the flask consisted of two separate phases. The dehydrated mixture on being cooled to room temperature separates 46 parts by weight of a solid product which is removed by filtration. When the mixture is allowed to stand undisturbed for 3 months, an additional 15 parts by weight of solid product is separated.

The two solid products contain almost all of the succinic acid originally present in the aqueous extract. The first lot consisting of 46 parts by weight is dissolved in a small amount of hot water and is treated with activated carbon to decolorize the crude acid. The active carbon is removed by filtration and the filtrate is cooled to separate the succinic acid crystals.

The first separation of crude succinic acid amounting to 46 parts by weight is extracted in a Soxhlet type extraction unit with about 494 parts by weight of acetone. About 1.3 parts by weight of insoluble inorganic solids remain undissolved. The acetone extract is evaporated to a small volume whereupon 24 parts by weight of crystals are separated. These crystals are dissolved in 50 parts by weight of water and the solution is boiled with 3 parts by weight of active carbon, filtered and cooled whereupon 16 parts by weight of relatively pure succinic acid are obtained. A small sample is recrystallized from water and compares with the literature data for succinic acid as follows:

| | Solid Acid | Literature Data for Pure Succinic Acid |
|---|---|---|
| Melting Point, ° C | 191–192 | 191–192 |
| Acid Equivalent | 59.2 | 59.5 |
| p-Bromophenacyl Ester, M. P., ° C | 217–219 | 217–219 |
| Combustion Analysis: | | |
| Per Cent H | 5.68 | 5.09 |
| Per Cent C | 40.58 | 40.65 |
| Per Cent O | 53.78 | 54.26 |

When the various mother liquors from the purification steps and the second lot of crude acid are processed for recovery, a total yield of about 45 parts by weight of succinic acid is obtainable (75% by weight of the two lots of crude acid separated).

The benzene-containing liquor from the succinic acid separation is diluted with 1305 parts by weight of benzene whereupon 73 parts by weight of a dark-colored liquid layer separates from the main liquid layer. The separated liquid is removed and the partially decolorized benzene solution is evaporated until a mixture containing about 300 parts by weight of oxidation products and about 525 parts by weight of benzene is obtained. The concentrated benzene solution is mixed with about 945 parts by weight of pentane whereupon a red liquid is rejected. The non-rejected benzene-pentane solution is evaporated on a steam bath and 31 parts by weight of a light red acid fraction are obtained. On standing a solid containing adipic and suberic acid almost free of contaminants is obtained. The solvents are evaporated from the rejected liquid at 4 mm. pressure and without heating whereupon 201 parts by weight of pentane-rejected acids are obtained.

Upon standing for several days a small amount of solid acid separates from the pentane-rejected acids. About 151 g. of liquid pentane-rejected acids are separated by decantation and are esterified by refluxing for about 2.5 hours with about 460 parts by weight of dry methanol in the presence of about 4 parts by weight of concentrated sulfuric acid. Following the refluxing the acid is removed by shaking with about 15 parts by weight of powdered sodium bicarbonate and thereafter with about 4.5 parts by weight of sodium carbonate. The excess methanol is removed by distillation at room temperature and 4 mm. pressure. The trace of inorganic solids in the esters is removed by filtration. The molecular weight of the esters is found to be 220 and the saponification equivalent is found to be 112 showing that the esters are esters of dibasic acids. Active hydrogen determinations show that about 15 to 20 per cent of the esters contain free hydroxy groups.

About 114 parts by weight of the methyl esters are extracted with one 95 parts and with seven 65 parts portions of pentanes. After removal of the solvent from both fractions about 48.5 parts by weight of light yellow extract and about 65 parts by weight of dark red raffinate are obtained respectively. It is found that the esters of hydroxylated acids are concentrated in the raffinate by the pentane solvent treatment.

Substantially the same results are obtained when either toluene or a mixture of xylenes is substituted for the benzene in the foregoing example.

Example II

A refined petroleum wax similar to that described in Example I is oxidized according to the methods described therein with the exception that the oxidization is stopped when an acid number of 234 is obtained. The oxidized wax is water-washed several times and the combined washing are concentrated by distillation while maintaining the temperature below 140° C. About 500 parts by weight of the concentrated dibasic acid containing mixture obtained thereby is refluxed with about 348 parts by weight of benzene in the manner described in Example I whereby about 128 parts by weight of water are distilled and collected in a water trap. On cooling and standing at 20°–30° C. a total of about 84 parts by weight of solid crude succinic acid are separated from the solution. A small amount of wash benzene is used to wash the crude acid and is added to the mother liquor. The resulting solution is estimated to contain about 270 parts by weight of oxidation product and about 400 parts by weight of benzene. The solution is mixed with about 1370 parts by weight of diethyl ether and the resultant mixture is cooled to about 2° C. whereupon 9.5 parts by weight of a dark viscous material is rejected. (About the same amount of rejected material is obtained when the operation is carried out at 25° C.) The rejected material is removed and about 58% by weight of the decolorized solution is mixed with 420 parts by weight of pentane whereby a portion of pentane rejected acids is separated and designated fraction A after evaporation of the solvent. Fraction A amounts to 23 parts by weight. Fraction B is obtained by adding an additional 420 parts by weight of pentane and evaporating the solvent from the thus rejected liquid. Fraction B amounts to 42 parts by weight. The non-rejected mother liquor is evaporated to remove the solvents, and the solids obtained thereby are extracted with pentane to remove the pentane-soluble acids. The non-extracted acids (fraction C) amounts to 80 parts by weight while the pentane-extracted acids (fraction D) after removal of the solvent amounts to 8 parts by weight.

Fractions A, B, C and D are analyzed to determine their acid and saponification numbers. In general, the ratio of the saponification number to the acid number is 1 for pure acids and is greater than 1 for esters and mixtures of esters and acids, etc. The following data are obtained for the fractions:

| Fraction | Neutralization No. | Saponification No. | Ratio, S/N |
|---|---|---|---|
| A | 355 | 521 | 1.47 |
| B | 399 | 534 | 1.34 |
| C | 452 | 523 | 1.16 |
| D | 252 | 301 | 1.22 |

The foregoing data show that there is a marked separation of saponifiable from non-saponifiable acid fractions by solvent treatment of the succinic acid-freed fractions with pentane. All four fractions A through D are quite rich in dibasic acids as determined by the fact that equivalent weight of the fraction is roughly one half of the molecular weight of the fraction. Fraction C is especially rich in dibasic acids and is relatively free of ester linkages.

Substantially the same results are obtained when stearic acid or n-decane are substituted for the wax during the oxidation step in this example.

The general process for the production of succinic acid and its homologs by oxidation and separation can also be carried out using raw materials other than petroleum hydrocarbons. The oxidation of the water-insoluble fraction of oxidized wax which comprises mostly fatty acids, hydroxy acids and various esters also yields succinic acid. Similarly, the oxidation of pure fatty acids containing more than about 7 carbon atoms per molecule yields succinic acid. Mixtures of suitable fatty acids may be obtained by the oxidation of any suitable petroleum hydrocarbons. Suitable fatty acids can also be obtained from plant and animal sources. In the oxidation of fatty acids, water-insoluble oxidized wax fractions and the like substantially the same methods and conditions of oxidization and separation of the succinic acid from the oxidized product are employed as have been hereinbefore described for the oxidation of wax and the separation of succinic acid from the oxidized wax.

While the preferred method of oxidation of wax or other paraffinic hydrocarbon for the production of succinic acid has been described hereinbefore, my method for recovery of the succinic acid and of the other dibasic acids may be applied generally to separate mixtures containing these constituents and prepared by other oxidation methods.

It is apparent that many modifications of my process can be made by those skilled in the art without departing from the spirit and scope of my invention and defined by the following claims.

I claim:

1. A process for the production of succinic acid which comprises oxidizing a paraffinic hydrocarbon by blowing with a gas containing free oxygen at a temperature between about 100° and 160° C. to produce an oxidized paraffin hydrocarbon, water washing said oxidized paraffin hydrocarbon to produce an aqueous extract of oxidized paraffin hydrocarbon, dehydating said aqueous extract by heating in the presence of an aromatic hydrocarbon having less than 9 carbon atoms per molecule at a temperature sufficient to produce a distillate containing water and said aromatic hydrocarbon and leave a residue of dehydrated water-soluble extract dissolved in said aromatic hydrocarbon and cooling said solution to separate solid succinic acid therefrom.

2. A process according to claim 1 wherein said solution of dehydrated water-soluble extract comprises between about 0.5 and 3.0 parts by weight of dehydrated water-soluble extract per part by weight of said aromatic hydrocarbon.

3. A process for the production of succinic acid which comprises oxidizing a refined petroleum wax by blowing with a gas containing free oxygen at a temperature between about 120° and 140° C., said refined petroleum wax having a melting point of between about 50° and 90° C., thereby producing an oxidized wax having an acid number between about 200 and 250, washing said oxidized wax with water at a temperature between about 80° and 120° C. to produce an aqueous extract of oxidized wax, dehydrating said aqueous extract by heating in the presence of an aromatic hydrocarbon having less than 9 carbon atoms per molecule at a temperature sufficient to produce a distillate containing water and said aromatic hydrocarbon and leave a residue of dehydrated water-soluble extract dissolved in said aromatic hydrocarbon, and cooling said solution of the dehydrated water-soluble extract to separate solid succinic acid therefrom.

4. A process according to claim 3 wherein said aromatic hydrocarbon solvent is benzene.

5. A process according to claim 3 wherein said aromatic hydrocarbon solvent is toluene.

6. A process according to claim 3 wherein said aromatic hydrocarbon solvent is benzene and said solution of dehydrated water-soluble extract comprises between about 1.0 and 2.5 parts by weight of dehydrated water-soluble extract per part by weight of benzene.

7. A process for the preparation and recovery of dibasic acids, said dibasic acids having more than 3 and less than 13 carbon atoms per molecule which comprises oxidizing a paraffin hydrocarbon by blowing with a gas containing free oxygen at a temperature between about 100° C. and 160° C. to produce an oxidized paraffin hydrocarbon, water-washing said oxidized paraffin hydrocarbon to produce an aqueous extract of oxidized paraffin hydrocarbon, dehydrating said aqueous extract by heating in the presence of an aromatic hydrocarbon having less than 9 carbon atoms per molecule at a temperature sufficient to produce a distillate containing water and said aromatic hydrocarbon and leave a residue of dehydrated water-soluble extract dissolved in said aromatic hydrocarbon, cooling said solution of dehydrated water-soluble extract to produce solid succinic acid and a mother liquor, removing said solid succinic acid from said mother liquor and adding to said mother liquor between about 0.3 and 10.0 parts by weight of a low boiling paraffinic hydrocarbon per part by weight of said mother liquor thereby forming an impure dibasic acid fraction and a dibasic acid concentrate dissolved in said paraffinic hydrocarbon.

8. A process for the preparation and recovery of dibasic acids, said dibasic acids having more than 3 and less than 13 carbon atoms per molecule, which process comprises oxidizing a paraffin hydrocarbon by blowing with a gas containing free oxygen at a temperature between about 100° C. and 160° C. to produce an oxidized paraffin hydrocarbon, water-washing said oxidized paraffin hydrocarbon to produce an aqueous extract of oxidized paraffin hydrocarbon, dehydrating said aqueous extract by heating in the presence of an aromatic hydrocarbon having less than 9 carbon atoms per moleucule at a temperature sufficient to produce a distillate containing water and said aromatic hydrocarbon and leave a residue of dehydrated water-soluble extract dissolved in said aromatic hydrocarbon, cooling said solution of dehydrated water-soluble extract to produce solid succinic acid and a mother liquor, removing said solid succinic acid from said mother liquor and recovering succinic acid-free dibasic acids from said mother liquor.

ANDREW I. SMITH.

REFERENCES CITED

The following references are of record in the file of this patent:

UNITED STATES PATENTS

| Number | Name | Date |
|---|---|---|
| 2,054,979 | Jahrstorfer et al. | Sept. 22, 1936 |
| 2,486,454 | Zellner | Nov. 1, 1949 |
| 2,533,620 | Polly | Dec. 12, 1950 |